June 3, 1958    M. A. ODOM    2,837,372
VEHICLE TRUNK COVER
Filed June 10, 1957
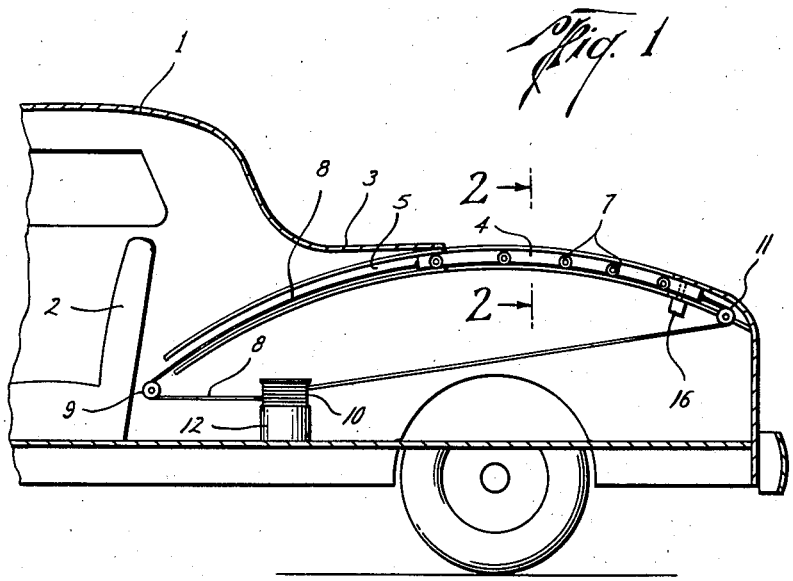
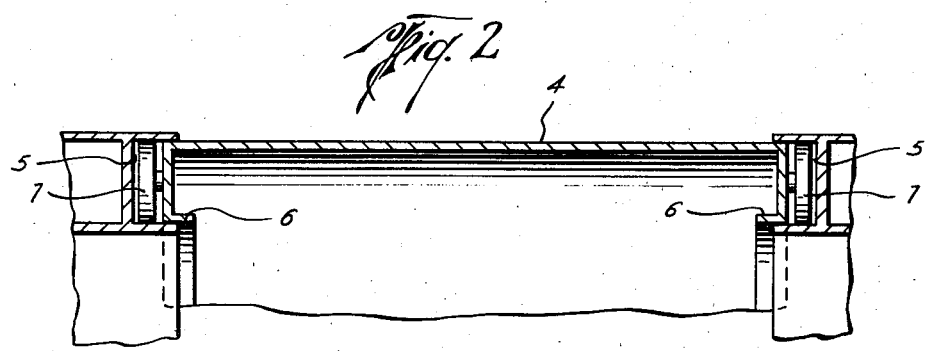
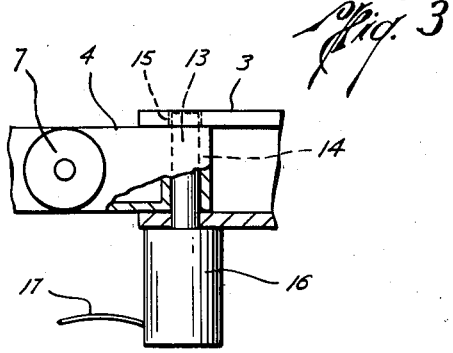
Mary Ann Odom
INVENTOR.
BY Ranseler O. Wyatt
ATTORNEY

United States Patent Office 2,837,372
Patented June 3, 1958

2,837,372
VEHICLE TRUNK COVER
Mary Ann Odom, Houston, Tex.

Application June 10, 1957, Serial No. 664,833

1 Claim. (Cl. 296—76)

This invention relates to new and useful improvements in a vehicle trunk cover.

It is an object of this invention to provide a vehicle trunk cover for passenger cars and the like that may be opened and closed by remote control.

It is another object of this invention to provide a vehicle trunk cover having novel means for moving into open and closed position.

With the above and other objects in view, the invention has relation to certain novel features of construction, operation and arrangement of parts more particularly defined in the following specifications and illustrated in the accompanying drawings, wherein:

Figure 1 illustrates the invention mounted in a vehicle, and is a side elevational cross sectional view.

Figure 2 is a cross sectional end view taken on the line 2—2 of Figure 1, and

Figure 3 is a fragmentary top view of the locking means employed.

Referring now more particularly to the drawings, the numeral 1 designates a vehicle body, such as that of a passenger car, having the usual seat 2 and trunk 3. The trunk 3 has the usual luggage compartment and aperture for loading and unloading in which the cover 4 is mounted. The side walls of the aperture are provided with roller guide channels 5, 5 and the cover 4 has the outwardly projecting shoulders 6, 6, and laterally extending therefrom the rotatably mounted rollers 7, 7. The channels 6, 6 extend into the body of the vehicle and arc downwardly to a position adjacent the back of the seat 2.

A cable, as 8, is secured to the respective end faces of the cover 4 and is mounted over the forward pulley 9 and a suitable winch 10 and the rear pulley 11. A suitable motor, such as an electrically driven motor 12, rotates the winch 10.

The cover 4 extends into the trunk body of the vehicle 1 when in closed position, past the rear margin of the aperture, and a locking pin 13, mounted in the trunk 3, extends through a port 14 in the cover 4 and into a receiving chamber 15 in the body of the vehicle. A suitably mounted operating means, such as the solenoid 16, activated through the electrical conduit 17, actuates the pin 13, moving the pin out of locking position when it is desired to open the trunk and releasing the pin to return same to locking position when it is desired to lock the cover in place.

Suitable electrical switches (not shown) may be employed from any desired position in the vehicle to activate the solenoid 16 and the motor 12, thus unlocking the cover 4 and drawing the same forwardly in the channels 5, 5 until the door is free of the luggage loading aperture and when it is desired to close the aperture to the trunk, the motor 12 is reversed, drawing the door back into closed position and the pin 13 is released to move into locking position.

While the foregoing is considered a preferred form of the invention, it is by way of illustration only, the broad principle of the invention being defined by the appended claim.

What I claim is:

In a vehicle trunk closure, a vehicle body having a luggage compartment, said compartment having a luggage receiving aperture, channels formed in said vehicle body in the side margins of said aperture and extending downwardly into said vehicle body, a cover, laterally extending rollers mounted in the side faces of said cover, said rollers being positioned in said channels, a cable connected to the front and rear faces of said cover, a winch in said vehicle body to which said cable is connected, an electric motor mounted within said vehicle body in operative connection with said winch, a latch means in said vehicle body having a locking pin adapted to extend into said cover when in closed position, a solenoid in operative connection with said latch means, and means for remote activation of said motor and solenoid to permit the opening and closing of said cover.

References Cited in the file of this patent

UNITED STATES PATENTS

| | | |
|---|---|---|
| 1,889,679 | Marin | Nov. 29, 1932 |
| 2,214,722 | De Seversky | Sept. 10, 1940 |
| 2,519,386 | Loving | Aug. 22, 1950 |
| 2,707,653 | Roden | May 3, 1955 |